Jan. 23, 1940.  G. R. ERICSON  2,187,876
WINDSHIELD WIPER
Filed Dec. 10, 1937
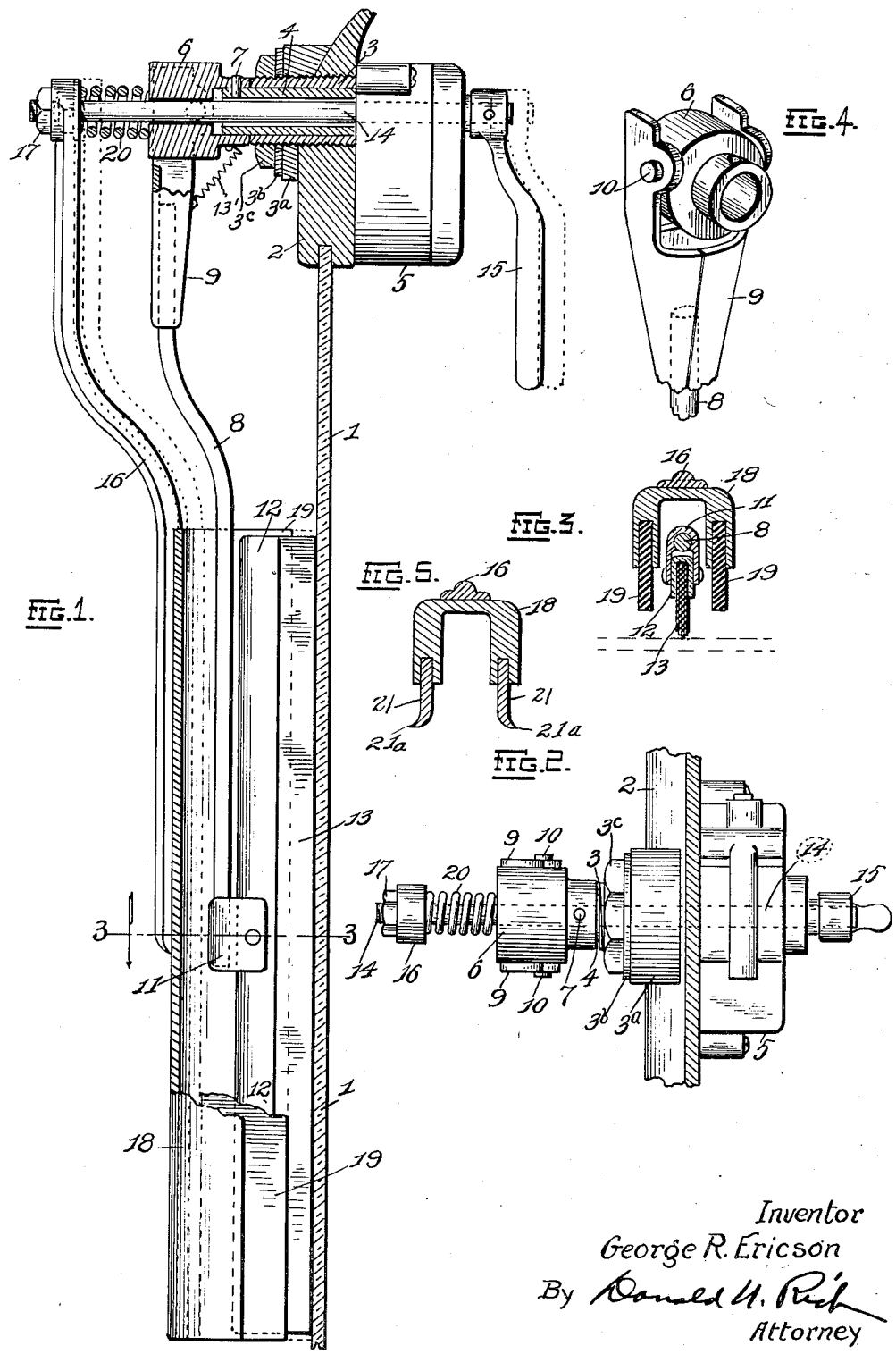
Inventor
George R. Ericson
By Donald U. Rich
Attorney Patented Jan. 23, 1940

2,187,876

UNITED STATES PATENT OFFICE 2,187,876

WINDSHIELD WIPER

George R. Ericson, St. Louis, Mo., assignor to Carter Carburetor Corporation, St. Louis, Mo., a corporation of Delaware Application December 10, 1937, Serial No. 179,085

4 Claims. (Cl. 15—255)

This invention relates to windshield wipers for automobiles and consists particularly in novel means for removing ice, sleet and other solid substances adhering to the windshield.

Edged windshield wiper elements formed of relatively hard materials have been suggested heretofore for the purpose of cutting or scraping ice and sleet from the windshield. Such blades are arranged so as to constantly engage the windshield regardless of whether or not ice and sleet is present and, since considerable force must be applied to the blade in order that it perform its intended function, the blade edge is subjected to rapid wear. Moreover, the windshield is apt to be damaged due to continued scraping of the blade across the surface of the glass. An ice removing blade is ordinarily not very efficient for wiping of moisture from the windshield and, accordingly, a wiping element of rubber or other soft material should also be provided for this purpose.

An object of the present invention is to provide a windshield cleaning device for removing ice, sleet, and dirt adhering to the surface of the glass, means being provided for selectively moving the cleaning element against and away from the surface of the glass as required.

Another object is to provide a device of the above type including a more or less conventional wiping element for removing moisture from the surface of the glass and a hard, edged element selectively movable into engagement with the glass, as required, for removing sleet and ice therefrom.

These objects and other more detailed objects hereafter appearing are attained substantially by the device illustrated in the accompanying drawing, in which Fig. 1 is a view, partly sectioned, showing a windshield wiper embodying the invention.

Fig. 2 is a top view of the device in Fig. 1.

Fig. 3 is a detailed section taken substantially on line 3—3 of Fig. 1.

Fig. 4 is a detail perspective view showing the support hub for the inner blade and Fig. 5 is a view similar to Fig. 3 but showing a modified form of ice removing blade, the inner, moisture wiping blade being omitted.

Fig. 1 shows a pane of window or windshield glass 1, secured at its upper edge in a bar 2, forming a part of the windshield framing. Threadedly mounted in bar 2 is a hollow nipple 3, which rotatably receives a hollow shaft or sleeve 4 operated at its inner end by a conventional electric or suction windshield wiper motor 5. Nipple 3 is secured in position and braced by bushing 3a, washer 3b and nut 3c. A hub 6 is rigidly secured to the outer end of sleeve 4 by a pin 7. A wire arm 8 has a clevis element 9 at its upper end pivotally secured to hub 6 by trunnions 10. Arm 8 at its lower end carries a clip 11 which is pinned or keyed to reenforcement backing 12 on a soft rubber windshield wiping blade 13. Sleeve 3 is rotated by motor 5 to cause blade 13 to swing back and forth for wiping moisture from the surface of the glass in the usual manner. A coil spring 13' extends between the clevis element 9 and the hub 6 to retain the wiper blade 13 in normal wiping contact with the associated face of the windshield 1. Motor 5 is provided with a convenient lever or button (not shown) for initiating operation thereof.

Extending concentrically through sleeve 4 and through motor 5 and operatively independent thereof, is a shaft 14 having a handle 15 secured to its inner end. A second arm 16 is secured to the outer end of shaft 14 by a nut 17 and at its lower end is secured, as by soldering or welding, to a U-shaped yoke element 18 which straddles blade 13. As shown in Fig. 3, each leg of element 18 mounts a scraping blade 19 of hard rubber or other stiff material preferably having its inner edge cut off sharp to provide sharp corners to facilitate removing ice and sleet from the surface of the glass.

Shaft 14 is reciprocable axially within sleeve 4 and is constantly urged toward its outermost position, shown in Fig. 1, by a coiled spring 20 compressed between hub 6 and the upper end of arm 16.

In operation, when it is desired to wipe water or other liquid from the surface of the glass, motor 5 is actuated which causes both blades 8 and 16 to reciprocate back and forth across the windshield, but only the soft blade 13 engages the surface of the glass. During normal operation of blade 13 as described, cutting or scraping blades 19 will be spaced from the glass so as to minimize wear on the blade and the possibility of damage of the glass. In case the windshield should become coated with ice, sleet, or dirt so as to render the soft blade 13 ineffective, the driver can bring scraping blades 19 into action by drawing handle 15 inwardly far enough to move the scraping blades against the surface of the glass. Ordinarily, motor 5 will not be sufficiently powerful to cut such ice or sleet formations and it will be necessary to continue the reciprocating motion of scraping blades 19 manually by means of handle 15. In some cases, particularly where a windshield warming device is used for defrosting purposes, the ice or sleet formation will be so softened that no great amount of force is necessary to clean the windshield, but even in such cases the usual soft, rubber blade, as shown at 13, is usually inadequate.

Fig. 5 shows a modification in which the U-shaped yoke 18 is provided with a pair of metal blades 21 with outwardly inclined, sharp edges, as at 21ª. Due to the fact that both blades 20 engage the surface of the glass simultaneously, the angles of cutting edges 21ª will be properly maintained. In this form the yoke 18 will be mounted on arm 16 and in relation to arm 8 and soft rubber blade 13, in the same manner as in the previous form.

The invention is not limited to the form shown but may be modified in various respects as will occur to those skilled in the art, and the exclusive use of all such modifications as come within the scope of the appended claims is contemplated.

I claim:

1. In a device for cleaning windshields, a bearing support, a pair of shafts rotatably carried by said support, arms on adjacent ends of said shafts, a scraping element on one of said arms and a wiping element on the other arm, both of said elements being disposed to engage a common portion of the same side of an associated windshield, spring means urging said arms apart and to normally maintain said wiping element in engagement with the associated windshield and said scraping element spaced therefrom, means on the shaft carrying said scraping element for moving said scraping element against the windshield and thereacross, and separate means on the shaft carrying said wiping element for moving the same across the windshield.

2. A device as specified in claim 1 in which said shafts are concentric and further including manual means for moving said scraping element against the windshield and both of said elements thereacross and a motor for moving said wiping element across the windshield.

3. A device for cleaning windshields, a motor driven wiper element arranged to be oscillated across an area of said windshield, a scraper element normally oscillated with said wiper for operation upon the same surface area, means normally retaining said scraper element out of contact with the windshield during normal motor actuation of said wiper element, and manual means operable during the actuation of said wiper for oscillation of said scraper for causing the area traversed by said wiper to be simultaneously engaged by said scraper for removing heavier material.

4. A wiper blade mounted in normal contact with and for movement across an area of an associated windshield, power means for actuating said wiper blade on its mounting for wiping operation, a scraper mounted for movement with said wiper blade during its power actuated wiping movement and over the same windshield area, said scraper being normally out of contact with the associated windshield area to be cleaned while under movement with the power actuated wiper, and means independent of the power means operating said wiper, for moving said scraper into contact with the windshield area being wiped to cause a simultaneous scraping action, said last named means being capable of causing the wiper and scraper to move over the associated windshield area independent of the power normally operating said wiper.

GEORGE R. ERICSON.